Patented Jan. 13, 1931

1,788,903

UNITED STATES PATENT OFFICE

WILLIAM D. WOLFE, OF CUYAHOGA FALLS, OHIO, ASSIGNOR TO THE GOODYEAR TIRE & RUBBER COMPANY, OF AKRON, OHIO, A CORPORATION OF OHIO

AGE RESISTOR FOR RUBBER

No Drawing.   Application filed November 6, 1929.   Serial No. 405,280.

This invention relates to the preparation of novel rubber compounds and it has particular relation to the preparation of compounds that are materially more durable than those ordinarily employed in the industry.

One object of the invention is to provide a method of treating rubber compounds which results in a material increase of the resistance of the compound to the action of oxygen and other agencies which heretofore have caused premature deterioration of the rubber.

Another object of the invention is to provide a method of treating rubber compounds which involves the use of certain by-products of the phenol industry for which there has heretofore been little or no commercial use.

Heretofore it has been observed that the gradual loss of tensile strength and elasticity characteristic of rubber goods was apparently occasioned by the action of atmospheric oxygen. It has been proposed, at least in part, to overcome these undesirable effects by incorporating into the rubber certain organic materials known to the industry as antioxidants, or age-retarders. Among the materials which have been suggested are the following: hydroquinone, diphenyl amine, and reaction products of certain aldehydes with amino bodies, a specific example of the latter type of compounds being the reaction product of aldol and naphthylamine. Most of the compounds heretofore tried, while exhibiting some tendency to retard the action of oxygen upon the rubber, have been undesirable in certain respects.

For example, some of them were observed to be unduly toxic to the workmen employed in handling them. Still others possessed strong and disagreeable odors which necessitated the installation of special ventilating equipment in the factories where they were used. Others were of tarry nature and were difficult to incorporate into the rubber. Also, most of the materials heretofore employed were manufactured from basic ingredients for which there was considerable demand for other purposes in the industry. Therefore, the ingredients were relatively expensive to obtain.

This invention consists in the discovery that a highly satisfactory antioxidant may be obtained from para hydroxy diphenyl by subjecting that compound to nitration and reduction by means of ordinary and well-known methods. Nitration is preferably effected by subjecting hydroxy diphenyl dissolved in alcohol to the action of nitric acid, a temperature of 50° to 60° C. being employed during the course of the reaction. The solution containing the reaction product, consisting essentially of mono nitro hydroxy diphenyl, is neutralized with a solution of 5% sodium hydroxide, after which it may be reduced to the corresponding amino compound by means of sodium hydrosulfite. In this reaction, approximately molecular proportions of the basic ingredients entering into the combination, are employed. The mechanics of the reaction may be represented by the following equation:

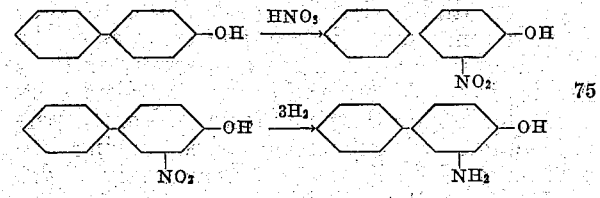

The position of the nitro and amino groups in the compounds has not been definitely established. However, it seems to be in the same nucleus as the hydroxy group.

The material obtained by the above described reactions is in a relatively high state of purity, and for commercial purposes it is only necessary to subject it to washing with water to obtain it in such form that it may be subjected to immediate use. The amino hydroxy diphenyl prepared in accordance with the preceding method may be employed successfully as an antioxidant in most of the standard rubber compounds. However, the following is an example of a formula in which it has been found to be particularly successful:

|  | Parts |
|---|---|
| Acetone extracted rubber | 100 |
| Zinc oxide | 5 |
| Sulphur | 3 |
| Stearic acid | 1.5 |
| Hexa methylene tetramine | 1 |
| Amino p-hydroxy diphenyl | 1 |

Samples of rubber prepared in accordance with the preceding formula were subjected to vulcanization for varying periods of time. These samples were then divided into two identical sets, one of which was immediately subjected to physical tests in order to ascertain the tensile strength and elasticity thereof prior to ageing. The second set was first weighed, and then placed in an oxygen bomb and subjected to the action of oxygen gas under a pressure of 150 pounds per square inch, and at a temperature of 50° C. for a period of six days. The results of these tests are tabulated as follows:

*Amino hydroxy diphenyl*

ORIGINAL

| Cure | | Load KgCM² at | | | Elong. break in % | Gain in wt. in % |
|---|---|---|---|---|---|---|
| Time in mins. | Temp. F.° | 500% elong. | 700% elong. | Tensile | | |
| 35 | 285 | 25 | 90 | 154 | 795 | |
| 50 | 285 | 31 | 124 | 176 | 760 | |
| 70 | 285 | 42 | 170 | 204 | 730 | |

AFTER AGEING

| | | | | | | |
|---|---|---|---|---|---|---|
| 35 | 285 | 28 | 101 | 148 | 770 | 0.31 |
| 50 | 285 | 36 | 135 | 168 | 740 | 0.20 |
| 70 | 285 | 48 | 180 | 180 | 700 | 0.34 |

From the above data it will be apparent that rubber compounds containing amino hydroxy diphenyl resist the action of oxygen to a remarkable degree, and samples of the material retain the major portion of their elasticity even under the severe conditions existing during the bomb tests. Also, the percentages of oxygen absorbed during the course of the test are comparatively slight. Under similar conditions, samples of rubber containing no antioxidant are reduced to resinous masses substantially devoid of elasticity and tensile strength and containing very high percentages of oxygen. The antioxidant is highly desirable from a commercial standpoint because the toxicity is low or nil and the compound is practically non-odorous. The compound is relatively stable and may be obtained in highly pure state. For that reason uniform results are obtained by its use.

Although I have described only the preferred forms which the invention may assume, it will be apparent to those skilled in the art that it is not so limited but that various minor modifications may be made therein without departing from the spirit of the invention or from the scope of the appended claims.

What I claim is:

1. A method of preserving rubber which comprises incorporating therein amino-p-hydroxy diphenyl.

2. A method of preserving rubber which comprises incorporating therein a reduction product of nitro hydroxy diphenyl.

3. A method of preserving rubber which comprises subjecting it to vulcanization in the presence of a material prepared by the nitration and reduction of hydroxy diphenyl.

4. A method of preserving rubber which comprises subjecting it to vulcanization in the presence of mono amino hydroxy diphenyl.

5. A rubber product that has been vulcanized in the presence of mono amino hydroxy diphenyl.

6. A rubber product that has been vulcanized in the presence of amino hydroxy diphenyl.

7. A rubber product that has been vulcanized in the presence of a reduction product of mono nitro hydroxy diphenyl.

8. A rubber product that has been vulcanized in the presence of a material prepared by the nitration and subsequent reduction of hydroxy diphenyl.

In witness whereof, I have hereunto signed my name.

Signed at Akron, in the county of Summit and State of Ohio, U. S. A., this 4th day of November, 1929.

WILLIAM D. WOLFE.